No. 614,135. Patented Nov. 15, 1898.
A. SCHMIDT.
RENDERING APPARATUS.
(Application filed Oct. 5, 1897.)

(No Model.) 2 Sheets—Sheet 2.

UNITED STATES PATENT OFFICE.

ADOLF SCHMIDT, OF CASSEL, GERMANY.

RENDERING APPARATUS.

SPECIFICATION forming part of Letters Patent No. 614,135, dated November 15, 1898.

Application filed October 5, 1897. Serial No. 654,169. (No model.)

*To all whom it may concern:*

Be it known that I, ADOLF SCHMIDT, director of the Aktien-Gesellschaft für Treber-Trocknung, a citizen of the Kingdom of Prussia, German Empire, and a resident of 49 Köllnischestrasse, Cassel, Germany, have invented certain new and useful Improvements in Apparatus for Treating Animal Carcasses, of which the following is a specification.

The invention relates to that class of apparatus illustrated in Letters Patent of the United States granted to H. C. F. Otte October 15, 1895, and numbered 547,801. That invention had for its object the treatment of animal carcasses and consisted of a jacketed cylinder having an inclosed revoluble drum-sieve and a crusher within the drum, with a conveyer or screw upon its outer periphery. The present invention is an improvement on this construction; and the improvements relate particularly to the form of the openings in the drum-sieve, to means for the introduction of whole carcasses, and the arrangement for securing a continuous flow of the extracted liquid, and finally to a construction which will prevent the escape of unpleasant odors and at the same time heat the feed-water.

The invention is illustrated in the accompanying drawings, in which—

Figure 1:
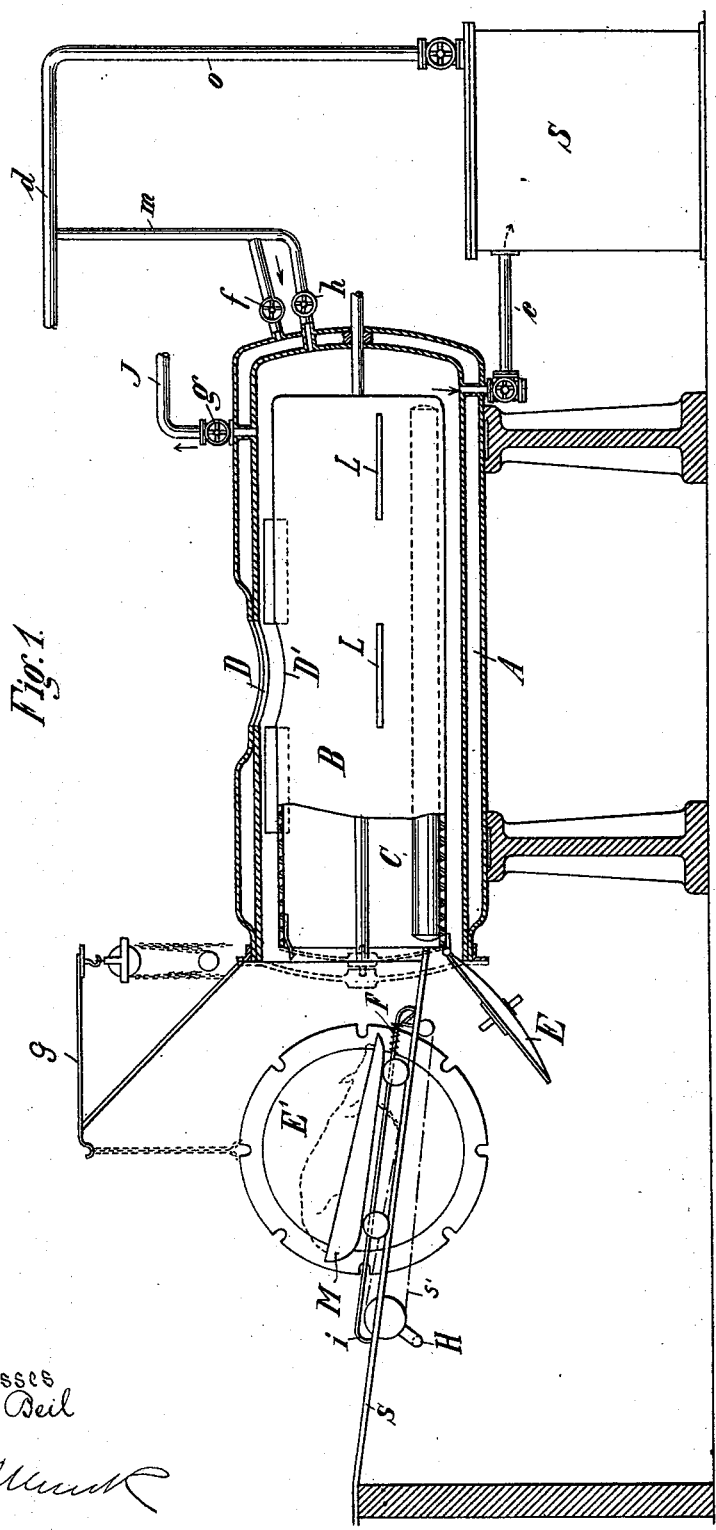
Figure 2:
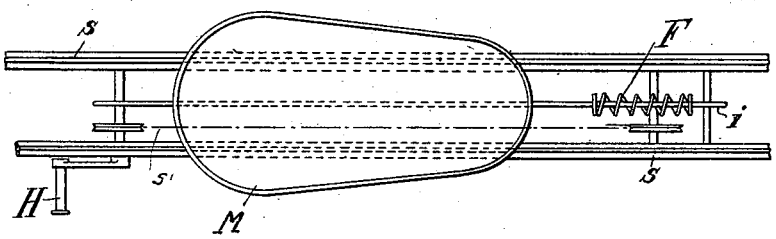
Figure 3:
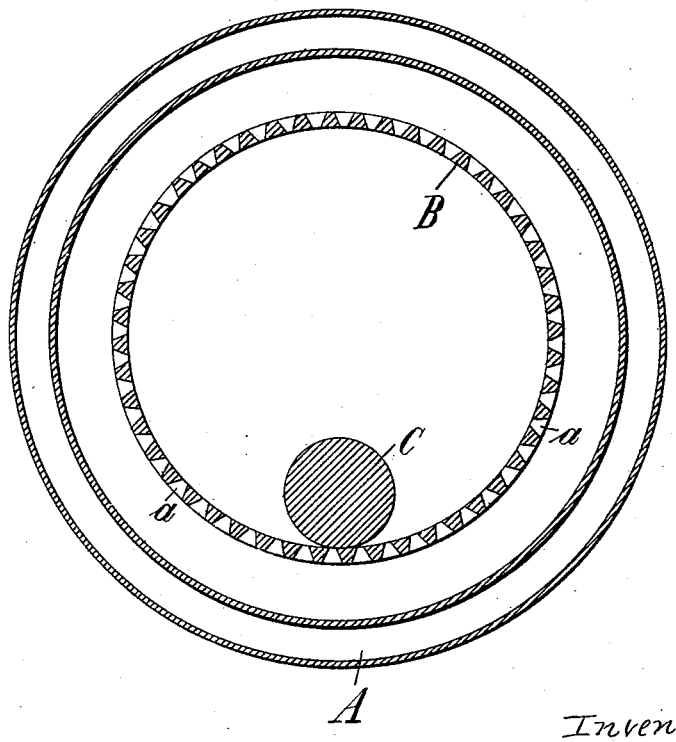

Figure 1 represents the apparatus partly in section and partly in side elevation. Fig. 2 shows the carcass-introducing device in plan. Fig. 3 is a sectional view taken through the disinfector and sieve-drum. Fig. 4 shows the arrangement of apparatus which takes up the vapors escaping on drying the boiled material.

The apparatus illustrated in the figures comprises principally a cylinder A, with double walls, and a sieve-drum B, rotating within a cylinder upon a suitable axle. Within the sieve-drum is located a crushing or disintegrating roller C, which disintegrates or comminutes the flesh particles and forces them through the sieve-openings *a*. In order to the more readily and effectively disintegrate or comminute the flesh particles these openings *a* are made conical or flaring, with their narrower portions toward the inner surface, whereby sharp edges, acting in conjunction with the roller or cylinder, produce a cutting effect, whereby the material is much more effectively comminuted and drops more readily through the flaring openings. These flaring openings and sharp edges are clearly shown in Fig. 3.

In order to stir or agitate the comminuted material, plates L are provided upon the exterior of the sieve-drum at suitable intervals.

The usual manhole D is provided in the external cylinder and a similar one, D', in the sieve-drum. In addition to these, however, I provide for the opening of the whole front of the cylinder and sieve-drum, whereby whole carcasses may be introduced.

The closing-plate E' for the cylinder is suspended upon a suitable crane *g*, while the plate or door E of the sieve-drum opens downward, as shown in full lines in Fig. 1.

An inclined way S, with a wheeled receptacle M on which carcasses rest, serves for introducing them into the interior of the sieve-drum. The receptacle is adapted to run by gravity down the inclined way and is provided with a spring-buffer consisting of a spring F, encircling a rigid guide-rod *i*, carried by the enclined way, and of sufficient power so that on the spring being struck by a suitable projection from the carriage it will be compressed, and on the carcass sliding off the compressed spring will immediately expand to force the wheeled receptacle back up the way. In case the buffer should fail to work at any time a chain *s'* (indicated by a dotted line in Fig. 1) may be provided for drawing the receptacle up the inclined way. This arrangement permits the introduction into the apparatus of large flesh pieces and whole carcasses without preceding comminution, the manholes D and D' being retained for the introduction of smaller pieces.

Having thus described the improved apparatus, the operation may be briefly stated as follows: After placing the material to be treated in the apparatus, either through the manholes D D', when it is small enough, or by means of the inclined way and receptacle or carriage, steam is first conducted into the double walls of the disinfector by pipe *f*. Fat and other soluble parts separate in liquid form, dropping through the sieve-drum into the space of cylinder A lying below, whence they flow off continuously into reservoir S through pipe *e*. As soon as the separation of the liquid constituents ceases the valve *p* is closed and valve *f* opened to heat the annular chamber, and the valve *g* is opened, whereby any vapors are conducted through the heating-worm and finally into the furnace.

Having thus described my invention, what I claim is—

1. In the described apparatus, a jacketed drum, a rotating sieve-drum within the same, said drum having openings of conical shape forming sharp cutting edges on the interior of the drum, and a roller adapted to coact with said cutting edges, substantially as described.

2. In combination with the disinfector A, a rotatable sieve-drum within the same, doors at the end of said disinfector and sieve-drum, a stationary inclined way arranged in line with said doors, and a wagon or receptacle moving on said way by gravity toward the disinfector to discharge its load automatically therein, substantially as described.

3. In combination, with the disinfector A, a rotatable sieve-drum within the same, doors at the end of said disinfector and sieve-drum, a stationary inclined way arranged in line with said doors, a wagon or receptacle moving on said way by gravity toward the disinfector to discharge its load automatically therein, and means for automatically returning the wagon up the inclined way after its load has been discharged, substantially as described.

4. In combination with the disinfector A, a rotatable sieve-drum within the same, doors at the end of said disinfector and sieve-drum, a stationary inclined way arranged in line with said doors, a wagon or receptacle moving on said way by gravity toward the disinfector to discharge its load automatically therein, and a spring-buffer carried by said wagon and adapted to return the carriage up the inclined way after the contents have been delivered, substantially as described.

In testimony that I claim the foregoing as my invention I have signed my name, in presence of two witnesses, this 20th day of September, 1897.

ADOLF SCHMIDT.

Witnesses:
ERNST JACOBI,
HERMANN KERSTING.